US005458801A

United States Patent [19]

Oyashiki et al.

[11] Patent Number: 5,458,801

[45] Date of Patent: Oct. 17, 1995

[54] PROCESS FOR PRODUCING GRANULAR BLEACH ACTIVATOR COMPOSITION AND GRANULAR BLEACH ACTIVATOR COMPOSITION

[75] Inventors: Tomonori Oyashiki; Hiroshi Noro; Koichiro Suzuki; Takeshi Ishikawa; Hiroyuki Yamashita, all of Wakayama; Muneo Aoyagi, Tochigi, all of Japan

[73] Assignee: Kao Corporation, Tokyo, Japan

[21] Appl. No.: 950,994

[22] Filed: Sep. 25, 1992

[30] Foreign Application Priority Data

| | | | |
|---|---|---|---|
| Sep. 27, 1991 | [JP] | Japan | 3-249306 |
| Oct. 30, 1991 | [JP] | Japan | 3-284554 |

[51] Int. Cl.$^6$ ..... C01B 15/00; C09K 3/00; C11D 3/395

[52] U.S. Cl. ..... 252/186.25; 252/186.27; 252/186.38; 252/95

[58] Field of Search ..... 252/186.25, 186.27, 252/186.3, 186.31, 186.38

[56] References Cited

U.S. PATENT DOCUMENTS

| | | | |
|---|---|---|---|
| 4,120,812 | 10/1978 | Lutz | 252/186.25 |
| 4,422,950 | 12/1983 | Kemper et al. | 252/186.38 |
| 4,444,674 | 4/1984 | Gray | 252/95 |
| 4,526,698 | 7/1985 | Kuroda et al. | 252/99 |
| 4,678,594 | 7/1987 | Parfomak et al. | 252/186.31 |
| 4,681,695 | 7/1987 | Divo | 252/94 |
| 4,695,397 | 9/1987 | Sommer et al. | 252/182 |
| 4,756,845 | 7/1988 | Sugawara et al. | 252/102 |
| 4,830,773 | 5/1989 | Olson | 252/174.13 |
| 5,002,691 | 3/1991 | Bolkan et al. | 252/186.25 |
| 5,219,549 | 6/1993 | Onda et al. | 423/415.2 |
| 5,279,757 | 1/1994 | Gethöffer et al. | 252/95 |

*Primary Examiner*—Gary L. Geist
*Assistant Examiner*—Joseph D. Anthony
*Attorney, Agent, or Firm*—Birch Stewart Kolash & Birch

[57] ABSTRACT

A granular bleach activator composition and a process for producing a granular bleach activator composition having excellent solubility and storability, which comprises using at least one member selected from the group consisting of substances (a), (b), (c) and (d) as a core particle and granulating the core particle and a powdery bleach activator in the presence of a water-soluble organic binder to give granules having a weight-average particle diameter of 100 to 3,000 μm:

(a) a water-soluble substance having a pH in a 3 wt. % aqueous solution thereof, of 2 to 10, (b) a borate-coated sodium percarbonate, the particle of which has an inner surface and/or an outer surface coated with the borate, (c) a borate-coated sodium perborate, the particle of which has an inner surface and/or an outer surface coated with the borate, and (d) sodium perborate other than the borate-coated sodium perborate (c).

20 Claims, No Drawings

PROCESS FOR PRODUCING GRANULAR BLEACH ACTIVATOR COMPOSITION AND GRANULAR BLEACH ACTIVATOR COMPOSITION

BACKGROUND OF THE INVENTION

1. Field of the Invention

The present invention relates to a process for producing a granular bleach activator composition having excellent solubility and storability, and also to a granular bleach activator composition.

2. Description of the Related Art

Various bleach activators have been proposed for improving the bleaching power of oxygenic bleaching agents such as sodium percarbonate (hereinafter referred to as PC occasionally) and sodium perborate (hereinafter referred to as PB occasionally). However, the functions of bleach activators are seriously impaired by the interactions with the oxygenic bleaching agent or other components of the detergent during storage. Therefore, bleach activators must be protected from its surroundings by granulation, surface coating or the like. However, any protective means which is utilized should not cause a deterioration in the dispersibility or solubility of the bleach activators in washing water.

Many investigations have been made in the prior art in order to satisfy these requirements for bleach activators. For example, U.S. Pat. No. 4,444,674 ("granular bleach activator composition", published on Apr. 24, 1984, PROCTER & GAMBLE Co., Ltd.) discloses a process for producing a lump bleach activator composition having good stability and high dispersibility by spraying a liquid binder and then a water-insoluble silica or silicate on the bleach activating component in a pan granulator. U.S. Pat. No. 4,695,397 ("granular bleach activator", published on Sep. 22, 1985, BASF AG) discloses a process for producing a granular bleach activator composition having good solubility by compression-molding a bleach activator, an expansible solubilizer and a dispersant on an extrusion granulator and then pulverizing and classifying the product. U.S. Pat. No. 4,681,695 ("bleach activator composition", published on Jul. 21, 1987, PROCTER & GAMBLE Co., Ltd.) discloses a process for producing a granular bleach activator composition by spray drying a bleach activator and a water-soluble or inorganic hydratable substance. European Patent No. 63512 ("granulated bleaching agent, process for producing the same and use thereof for a detergent bleach composition") discloses a process for granulating tetraacetylethylenediamine and an alkali metal polyphosphate by using an aqueous solution of sodium carboxymethylcellulose as a binder.

The conventional granular bleach activator compositions as described above have good storage ability when they are stored alone and they are relatively rapidly dissolved in water when warm water is used for washing as in the U.S.A. and in European countries. As in most cases in Japan, however, when washing is conducted under the condition of weak agitation in cold water or when bleaching is conducted under the condition where scarcely any stirring force is applied, such as under mere immersion, the conventional granular bleach activator composition will have such a low dissolution velocity that the functions of the bleach activators cannot be sufficiently exhibited. When the conventional granular bleach activator composition is blended with PC or PB, the reaction of PC or PB with the bleach activator occurs to impair the storability of the composition.

DISCLOSURE OF THE INVENTION

SUMMARY OF THE INVENTION

An object of the present invention is to provide a granular bleach activator composition having a high dissolution velocity even under the condition where scarcely any stirring force is applied, such as washing with weak agitation at low temperature or bleaching by mere immersion. The granular bleach activator also has excellent storability, even when it is blended with PC or PB.

After extensive investigations, the present inventors have found that the above-described problem posed in the production of granular bleach activator compositions can be solved by granulating core particles with a powdery bleach activator in the presence of a water-soluble organic binder and, if necessary, coating the surfaces of the obtained granules with a water-soluble polymeric substance. The present invention has been completed on the basis of this finding.

Thus, the present invention relates to a process for producing a granular bleach activator composition (I), which comprises or consists essentially of using at least one member selected from the group consisting of substances (a), (b), (c) and (d) as a core particle and granulating the core particle and a powdery bleach activator in the presence of a water-soluble organic binder to produce granules having a weight-average particle diameter of 100 to 3,000 μm:

(a) a water-soluble substance having a pH in a 3 wt. % aqueous solution thereof, of 2 to 10, (b) a borate-coated sodium percarbonate, the particle of which has an inner surface and/or an outer surface coated with the borate, (c) a borate-coated sodium perborate, the particle of which has an inner surface and/or an outer surface coated with the borate, and (d) sodium perborate other than the above borate-coated sodium perborate (c).

Therefore, the present invention includes:

a process for producing a granular bleach activator, which comprises using water-soluble core particles having a pH in a 3 wt. % aqueous solution thereof, of 2 to 10, and granulating the powdery bleach activator in the presence of a water-soluble organic binder to produce granules having a weight-average particle diameter of 100 to 3,000 μm, and a process for producing a granular bleach activator, which comprises granulating either core particles of sodium percarbonate or sodium perborate having an inside and/or a surface penetrated and/or coated with a borate or core particles of sodium perborate having an inside and a surface neither penetrated nor coated and a powdery bleach activator under agitation and rolling in the presence of a water-soluble organic binder to produce granules having a weight-average particle diameter of 100 to 3,000 μm.

The present invention further relates to a process for producing a granular bleach activator composition (II), which comprises or consists essentially of adding a water-soluble high-molecular weight substance or an aqueous solution of a water-soluble high-molecular weight substance to the granular bleach activator composition (I) produced as described above, mixing them and then or at the same time heating, cooling or drying them to produce granules having a surface coated with the water-soluble high-molecular weight substance and having a weight-average particle diameter of 100 to 4,000 μm.

The present invention also relates to a granular bleach activator composition (I) comprising or consisting essentially of at least one member selected among the above-described substances (a), (b), (c) and (d) and having a coating layer (i) formed thereon which comprises or consists essentially of 10 to 500 parts by weight of a bleach activator and 3 to 100 parts by weight of a water-soluble organic binder based on 100 parts by weight of the substance and having a weight-average particle diameter of 100 to 3,000 μm; and to a granular bleach activator composition (II) comprising or consisting essentially of the granular bleach activator composition (I) described above and having further a coating layer (ii) formed thereon which comprises or consists essentially of 0.5 to 50 parts by weight of a water-soluble high-molecular weight substance based on 100 parts by weight of the granular bleach activator composition (I) and having a weight-average particle diameter of 100 to 4,000 μm.

The present invention also relates to a blended composition comprising or consisting essentially of one or both of the above-described granular bleach activator compositions (I) and (II), and sodium percarbonate and/or sodium perborate.

Further scope and the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE INVENTION

Among the core particles to be used in the present invention, the substance (a) is selected among those satisfying the following requirements (1) and (2) and further preferably having a weight-average particle diameter described in requirement (3) and properties described in requirement (4):

(1) it must be soluble in water. Thus, since the granular bleach activator composition of the present invention is to be incorporated into a detergent or bleach composition, it must be soluble in water.

(2) the pH in a 3 wt. % aqueous solution thereof must be 2 to 10 and preferably 4 to 8. When the pH is less than 2 or above 10, the core particle might inhibit the activity of the bleach activator or impair the stability of the bleach activator composition.

(3) it must have a weight-average particle diameter of preferably 50 to 3,000 μm and desirably a particle diameter distribution as narrow as possible. When it has a weight-average particle diameter of below 50 μm, the relative amount of fine granules having a particle diameter of below 100 μm in the obtained granules is increased and the granulation yield is low, whereas when it has a weight-average particle diameter of above 3,000 μm, the granules obtained as the final product will have poor solubility.

(4) it must have a melting point or a softening point of above 50° C., low hygroscopicity, high mechanical strength and low stickiness.

Specific examples of the core particles (a) satisfying the above-described requirements (1) and (2) and preferably having a weight-average particle diameter as specified in requirement (3) and properties as specified in requirement (4) and generally usable include inorganic and organic core particles. Preferred inorganic core particles include sodium dihydrogenphosphate, potassium dihydrogenphosphate, potassium chloride, sodium chloride, sodium sulfate, magnesium sulfate, ammonium phosphate and sodium nitrate, among which particularly preferred is sodium sulfate. Preferred organic core particles include sugar, calcium acrylate, magnesium acrylate, citric acid, succinic acid, fumaric acid, maleic acid and sodium alginate, among which particularly preferred are citric acid, sugar, sodium alginate and calcium acrylate.

The core particles (b), (c) and (d) to be used in the present invention are as follows:

(b) a borate-coated sodium percarbonate, the particle of which has an inner surface and/or an outer surface coated with the borate, (c) a borate-coated sodium perborate, the particle of which has an inner surface and/or an outer surface coated with the borate, and (d) sodium perborate other than the borate-coated sodium perborate (c).

The phenomenon wherein the inner surface of the particle is coated with the borate is referred to herein also as a phenomenon wherein the inside of the particle is penetrated with the borate.

Among the core particles to be used in the present invention, the particles (b), (c) and (d) have preferably a weight-average particle diameter of 50 to 3,000 μm and a particle diameter distribution as narrow as possible. When they have a weight-average particle diameter of below 50 μm, the relative amount of fine granules having a particle diameter of below 100 μm in the obtained granules is increased and the granulation yield is low, whereas when they have a weight-average particle diameter of above 3,000 μm, the granules obtained as the final product will have low solubility. PC not coated with the borate is unsuitable for the object of the present invention, since it has poor storability.

The borate to be used as the penetrating or coating agent for obtaining the above-described particles (b) or (c) is preferably sodium borates, still preferably sodium metaborate. A penetrating or coating composition comprising the above-described penetrating or coating agent and a sequestering agent such as an ethylenediaminetetraacetate, nitrilotriacetate and phosphates is usable for coating the inner surface and/or the outer surface of a PC or PB particle, i.e., for penetrating or coating a PC or PB particle. Such a composition may contain an inorganic salt such as a silicate or sulfate.

The amount of the borate necessary for penetration or coating is generally 0.5 to 10% by weight, preferably 2 to 8% by weight, based on PC or PB.

Stable PC or PB can be obtained by the solid-liquid mixing of PC particles or PB particles with an aqueous borate solution followed by drying. The concentration of the aqueous borate solution is desirably 20 to 70% by weight. In order to obtain PC particles or PB particles having an inside and a surface penetrated and coated with the borate, in other words, having a borate coating layer on the inner surface and the outer surface thereof, the solid-liquid mixing temperature must be suitably selected depending on the properties of the PC particles or PB particles to be used, the kind of the borate to be used and the concentration of the aqueous borate solution. Stable PC particles or PB particles can be obtained by conducting the solid-liquid mixing followed by drying even only once. However, the allowance of the conditions wherein stable PC particles or PB particles can be produced in only one run is considerably narrow. Therefore it is advantageous to repeat the solid-liquid mixing and drying at least twice, preferably twice or thrice, from an industrial viewpoint.

The bleach activators usable in the present invention may be known bleach activators. They include, for example, tetraacetylethylenediamine, glucose pentaacetate, tetraacetylglycoluril and alkanoyloxybenzenesulfonates. The alkanoyloxybenzenesulfonates are preferably those in which the alkanoyl group has 2 to 22 carbon atoms. Bleach activators of the following general formulas (I) or (II) are also desirable:

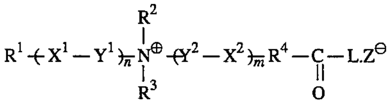

(I)

wherein $R^1$ represents an optionally substituted straight-chain or branched alkyl or alkenyl group having 1 to 20 carbon atoms, a phenyl group or an alkyl-substituted aryl group in which the alkyl substitutent(s) has(have) 1 to 20 carbon atoms in total, $X^1$ and $X^2$ each represents

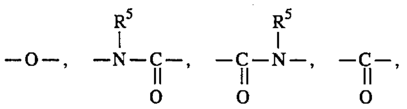

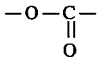 or 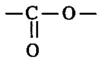

($R^5$ being H or an optionally substituted straight-chain or branched alkyl or alkenyl group having 1 to 20 carbon atoms), $Y^1$ and $Y^2$ each represents an optionally substituted alkylene or hydroxyalkylene group having 1 to 12 carbon atoms or a polyoxyalkylene group having an addition mole number of 1 to 20, m and n each represents 0 or 1, $R^2$ and $R^3$ may be the same or different from each other and each represent an alkyl group having 1 to 3 carbon atoms, $R^4$ represents an optionally substituted alkylene group having 1 to 12 carbon atoms or

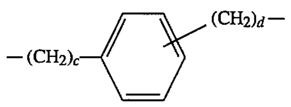

(c and d each being 0, 1 and 2)

L represents an eliminable group, that is a group which is capable of reacting with hydrogen peroxide and breaking off to form an organic peracid, and Z represents an inorganic or organic anionic group with the proviso that when

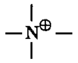

and L form together an inner salt, $Z^{\ominus}$ may not be included in the above formula.

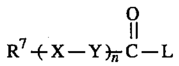

(II)

wherein $R^7$ represents an optionally substituted straight-chain or branched alkyl or alkenyl group having 1 to 22 carbon atoms or an aryl group unsubstituted or substituted with an alkyl group having 1 to 22 carbon atoms, X represents —O—,

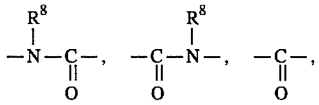

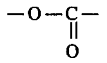 or 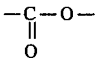

($R^8$ being H or an optionally substituted straight-chain or branched alkyl or alkenyl group having 1 to 22 carbon atoms), Y represents an optionally substituted alkylene or hydroxyalkylene group having 1 to 12 carbon atoms or a polyoxyalkylene group having an addition mole number of 1 to 20, n represents 0 or 1, and L represents an eliminable group capable of reacting with hydrogen peroxide to form an organic peracid.

Typical examples of the substituents as regards the expression "optionally substituted" in the present invention include hydroxyl and alkoxy groups.

Examples of the eliminable groups L in the above general formulas (I) and (II) include:

a) a group represented by:

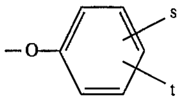

wherein s and t may be the same or different from each other and each represent —H, —$SO_3M$, —COOM, —$COOR^{10}$, —OH, a halogen atom, —$OR^{10}$, —$R^{10}$ or —$N(R^{10})_3$.A (M being an alkali metal, alkaline earth metal, ammonium salt, alkanolammonium salt or a negative charge per se, $R^{10}$ being H or an alkyl, alkenyl or hydroxyalkyl group having 1 to 20 carbon atoms, —$(C_2H_4O)_{1-5}H$ or —$(C_3H_6O)_{1-5}H$, and A being an inorganic or organic anion, b) an oxime group having a structure of the formula:

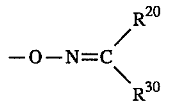

wherein $R^{20}$ and $R^{30}$ may be the same or different from each other are the same as $R^{10}$, with the proviso that at least one of them is not H, c) an imidoxime group of the formula:

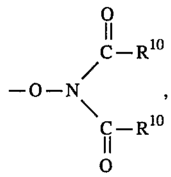,
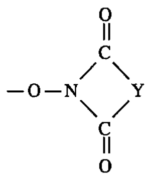 or

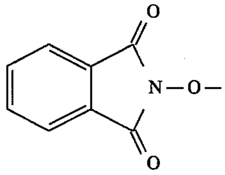

wherein $R^{10}$ is as defined above and Y represents an alkylene group having 1 to 9 carbon atoms which may have a hydroxyl group, $-(C_2H_4O)_{1-5}-C_2H_4-$ or $-(C_3H_6O)_{1-5}-C_3H_6$, d) an alkanesulfonic acid group of the formula:

$-O-Y-SO_3M$ wherein Y and M are as defined above, e) a polyglycol ester group of the formula:

$-O-(CH_2COO)_kH$ wherein k represents a number of 1 to 10, f) an acid anhydride group of the formula:

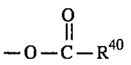

wherein $R^{40}$ represents an alkyl or alkenyl group having 1 to 22 carbon atoms or an optionally substituted phenyl group, g) an amide group of the formula:

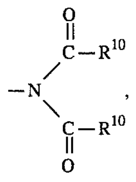,
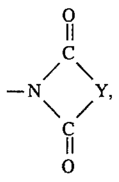,

-continued

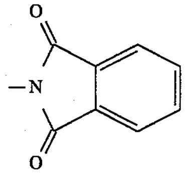 or 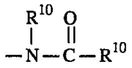

wherein $R^{10}$ and Y are as defined above, h) a group of the following formula to form a pyrrolidonecarboxylic acid derivative:

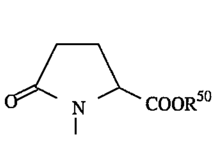 or 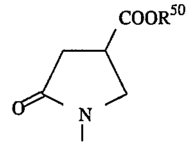

wherein $R^{50}$ represents M or $R^{10}$, i) a group of the following formula to form a ketone derivative:

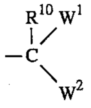

wherein $R^{10}$ is as defined above, and $w^1$ and $w^2$ may be the same or different from each other and each represent

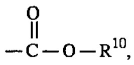, 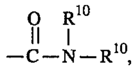, 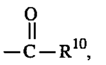, $-C{\equiv}N$, $-NO_2$ or $-SO_2R^{10}$ and when two or more $R^{10}$'s are present, they may be the same or different from each other, and j) a group of the following formula to form an enole derivative:

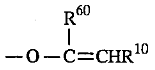 or 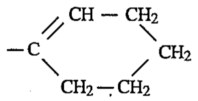

wherein $R^{60}$ is the same as $R^{10}$ except for H.

Preferred compounds are those of the above general formula (I) wherein $R^4$ represents an optionally substituted alkylene group having 1 to 12 carbon atoms, L represents

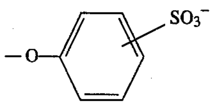

and m is 0.

The granule of the bleach activator to be used in the present invention is one having a particle diameter of generally 0.5 to 200 μm, preferably 2 to 10 μm.

Examples of the water-soluble organic binders usable in the present invention include polyethylene glycol, polypropylene glycol and nonionic surfactants. A suitable polyethylene glycol, is one having a molecular weight of 400 to 20,000, still preferably 600 to 10,000. Examples of the nonionic surfactants include polyoxyethylene (molar number of added ethylene oxide molecules: 3 to 300) alkyl (having 8 to 22 carbon atoms) ethers, polyoxyethylene (molar number of added ethylene oxide molecules: 10 to 300) alkyl (having 8 to 14 carbon atoms)phenol ethers, nonionic surfactants available on the market under the trade names of Pluronic and Tetronic, and fatty acid glycerides having 8 to 20 carbon atoms. Among these water-soluble organic binders, polyethylene glycols, polypropylene glycols and nonionic surfactants each having a melting point of 20° to 80° C. are preferred. They do not melt at a temperature below 20° C. and have stickiness and film-forming properties at a temperature of 20° C. or higher. Since the temperatures of the raw materials of above 80° C. are not preferred in the granulation step from the viewpoint of thermal decomposition of the bleach activator, a water-soluble organic binder to be used is preferably one having a melting point of 20° to 80° C., still preferably 30° to 70° C.

Known additives can be used in the present invention in addition to the core particles, bleach activator and water-soluble organic binder. The additives include, for example, anionic surfactants such as sulfonates and sulfates having an alkyl group having 8 to 22 carbon atoms and alkylbenzenesulfonates having an alkyl group having about 9 to 15 carbon atoms; nonionic surfactants such as alkylphenol/ethylene oxide condensates having a straight-chain or branched alkyl group having about 6 to 12 carbon atoms which are produced by condensing an alkylphenol with 5 to 25 mol of ethylene oxide; antiredeposition agents such as polyvinylpyrrolidone; and bleach stabilizers such as polysodium acrylate. Magnesium salts such as magnesium sulfate and magnesium silicate which are known as a stabilizer for the peroxide or peroxide adducts are also usable.

To further improve the storability of the granular bleach activator composition, a solid or powdery salt can be used in addition to the above-described substances. They include, for example, organic acids such as formic acid, propionic acid, citric acid, fumaric acid and succinic acid; inorganic acids such as phosphoric acid and sodium sulfite; and acidic zeolites.

The relative amounts of the core particles, bleach activator and water-soluble organic binder are such that to 100 parts by weight of the core particles, 10 to 500 parts by weight, desirably 10 to 300 parts by weight, more desirably 10 to 200 parts by weight, most desirably 50 to 200 parts by weight and particularly 70 to 150 parts by weight of the bleach activator, and 3 to 100 parts by weight, desirably 3 to 80 parts by weight, more desirably 3 to 60 parts by weight and most desirably 5 to 50 parts by weight of the water-soluble organic binder are utilized.

When the amount of the bleach activator is below 10 parts by weight, the bleaching effect is unfavorably low and, to the contrary, when it exceeds 500 parts by weight, a part of the bleach activator remains nongranulated in the granulation system to make the production of good granules impossible.

When the amount of the water-soluble binder is less than 3 parts by weight, granulation is insufficiently unfavorable and, to the contrary, when it exceeds 100 parts by weight, the kneading in the granulating machine becomes excessive and good granulation becomes impossible and, in addition, the raw materials undesirably adhere to the inner wall of the granulating machine.

In the present invention, a granular bleach activator composition (I) comprising core particles having, on the surfaces, a coating layer (i) composed of a bleach activating agent and a water-soluble organic binder are produced by granulating the core particles and the powdery bleach activator in the presence of the water-soluble organic binder.

In the present invention, another coating layer (ii) composed of a water-soluble high-molecular weight substance can be formed, if necessary, on the surface of the granular bleach activator composition (I) to produce a granular bleach activator composition (II). By the presence of the coating layer (ii), the storability of a blend comprising the granular bleach activator composition (II) and PC or PB is excellent.

Preferred examples of the water-soluble high-molecular weight substances usable for forming the coating layer (ii) in the present invention include polysaccharides which may have a sulfate group, such as pullulan, dextrin and alkali metal alginates; polysaccharides having a hydroxyalkyl or carboxyalkyl group, such as hydroxypropylcellulose, hydroxypropylmethylcellulose and sodium carboxymethylcellulose; methylcellulose; polyvinylpyrrolidone; polyvinyl alcohol; and polyethylene glycol. Among them, hydroxypropylmethylcellulose and polyvinyl alcohol are preferred.

100 parts by weight of the granular bleach activator composition (I) is mixed with preferably 0.5 to 50 parts by weight, still preferably 1 to 30 parts by weight, of the water-soluble high-molecular weight substance. An amount of the water-soluble high-molecular weight substance of below 0.5 part by weight is insufficient for coating the whole surface of the granular bleach activator composition (I) and, on the contrary, when it exceeds 50 parts by weight, the solubility of the granular bleach activator composition (II) in water is unfavorably decreased.

The granules, i.e., the granular bleach activator compositions (I) and (II) are produced by a process capable of forming granules which can be easily disintegrated or dissolved in the solution. Suitable granulation processes include fluidization granulation processes, rolling granulation processes, and agitation/rolling granulation processes. Fluidization granulators include, for example, SPIR-A-FLOW (mfd. by FREUND INTERNATIONAL LTD.) and MULTI-PROCESSOR (mfd. by POWREX CORPORATION).

Rolling granulators include, for example, MARUMERIZER (mfd. by FUJI PAUDAL Co., Ltd.) and CF Granulator (mfd. by FREUND INTERNATIONAL LTD.).

Agitation rolling granulators include, for example, a Henschel mixer (mfd. by MITSUI MIIKE ENGINEERING CORPORATION), a high-speed mixer (mfd. by FUKAE POWTEC) and a VERTICAL GRANULATOR (mfd. by POWREX CORPORATION).

Although each of these agitation rolling granulators has a perpendicular agitating shaft having stirring blades in a vertical agitation vessel, a Lö dige mixer (mfd. by Lödige Co., Ltd., Germany) which is a horizontal granulator having a horizontal agitating shaft is also usable.

Among the above granulation processes, the agitation/rolling granulation process is particularly preferred from the viewpoints of the sphering of the granules, the control of the particle diameter, the mechanical strength of the granules, etc.

When the core particles comprises one or more members selected among the substances (b), (c) and (d), dry granulation by the agitation/rolling granulation process is preferred, since the control of the particle diameter and the sphering of the granules are easy in this process and the granules which can be easily disintegrated or dissolved in the solution are easily produced.

The granulation is conducted, for example, by feeding the core particles, the water-soluble organic binder and the bleach activator into any of the above granulators and mixing them while introducing a heat medium such as warm water into a jacket of the granulator or blowing hot air thereinto. When the temperature of the raw materials in the granulator exceeds the melting point of the water-soluble organic binder, granulation starts around the core particles to form spherical granules. The water-soluble organic binder and the bleach activator can be added in small portions in the course of granulation. From the viewpoints of solubility in water and easiness of handling, the weight-average particle diameter of the granule of the present invention is preferably 100 to 3,000 μm. After the completion of the granulation, the granules may be sized in such a manner that at least 90% by weight thereof have a diameter of 100 to 3,000 μm, preferably 200 to 1,500 μm, on a sieve or sizer, if necessary.

The method of surface coating of the granular bleach activator composition (I) with the water-soluble high-molecular weight substance is not particularly limited in the present invention, and includes:

(1) a method wherein the water-soluble high-molecular weight substance or an aqueous solution containing the water-soluble high-molecular weight substance is added at once to the granular bleach activator composition (I) and the mixture is heated or dried, (2) a method wherein the water-soluble high-molecular weight substance or an aqueous solution containing the water-soluble high-molecular weight substance is added in portions to the granular bleach activator composition (I) while the mixture is heated or dried, and (3) a method wherein the molten water-soluble high-molecular weight substance or an aqueous solution containing the water-soluble high-molecular weight substance is sprayed on the granular bleach activator composition (I) while they are cooled or dired.

To form the coating layer (ii) having more excellent properties, the method wherein the aqueous solution containing the water-soluble high-molecular weight substance is sprayed on the granular bleach activator composition (I) while they are dried is particularly preferred.

Examples of preferred apparatus for applying the surface coating include fluidized layer coaters such as a SPIR-A-FLOW (mfd. by FREUND INTERNATIONAL LTD.) and a MULTI-PROCESSOR (mfd. by. POWREX CORPORATION); and pan coaters such as an AQUA COATER (mfd. by FREUND INTERNATIONAL LTD.) and a DRIA COATER (mfd. by POWREX CORPORATION).

In one embodiment of the process, granules containing a bleach activator are placed in a pan coater and hot air is blown into the coater while rotating the coating pan. Simultaneously an aqueous solution containing a water-soluble high-molecular weight substance is sprayed through the nozzle of a spray gun at a suitable rate and the granules thus treated are dried. The coating with a water-soluble high-molecular weight substance can be conducted by this method. In this step, talc, precipitated calcium carbonate or titanium dioxide may be added as a coagulation inhibitor.

The diameter of the granule (II) having the coating layer (ii) comprising the water-soluble high-molecular weight substance is preferably weight-average particle diameter of from 100 to 4,000 μm in consideration of its solubility in water.

The blended composition of the present invention comprises the granular bleach activator compositions (I) and/or (II) of the present invention produced as described above and PC and/or PB. The blend composition may further contain a detergent ingredient such as an anionic surfactant to form a bleaching detergent composition.

Thus the present invention can provide granular bleach activator compositions having a high dissolution velocity even under the condition where scarcely or a weak stirring force is applied, such as washing under weak agitation at low temperature or bleaching by mere immersion, and also having an excellent storability even when blended with PC or PB.

The blended composition of the present invention exhibits a bleachability higher than that of a conventional bleaching composition due to its high dissolution velocity.

EXAMPLES

The following Examples will further illustrate the present invention, which by no means limit the invention.

Example 1

3.0 kg of Glauber's salt (sodium sulfate) having a weight-average particle diameter of 500 μm, 2.0 kg of tetraacetylethylenediamine (TAED) and 0.6 kg of polyethylene glycol (PEG 6000) (total: 5.6 kg) were fed into a granulator (High-Speed Mixer FS-GC-10; mfd. by FUKAE POWTEC) and granulated under the conditions comprising a jacket temperature of 70° C., a main shaft rotation speed of 300 rpm and a chopper rotation speed of 1700 rpm for about 20 min. After the completion of the granulation, the granules were cooled by introducing cold water (15° C.) into the jacket. After lowering the temperature of the granules to 40° C. or below, the granules were sieved to collect those having a diameter of 350 to 1,000 μm (weight-average particle diameter: 550 μm). The yield of the final product was 94% by weight based on the granules before being sieved.

Example 2

4.5 kg of the granular bleach activator composition obtained in Example 1 as the final product was fed into a pan coater (DRC-500; mfd. by FREUND INTERNATIONAL LTD.). The coating pan was rotated at 20 rpm while introducing 3.5 $m^3$/min of hot air at 65° C. thereinto. When the temperature of the powder or granules had reached 35° C., spraying of 20 g/min of a 10 wt. % aqueous solution of hydroxypropylmethylcellulose was started and continued for 70 min. Then the temperature of the hot air was lowered to 50° C. and drying was conducted for about 10 min. The powder or granules was(were) cooled by introducing cooling air at 20° C. When the temperature of the powder or granules was lowered to 30° C. or below, the surface-coated granules thus produced were sieved to give the intended product having a particle diameter of 350 to 1,000 μm (weight-average particle diameter: 570 μm).

Example 3

1.8 kg of sugar having a weight-average particle diameter of 500 μm was fed into a granulator (High-Speed Mixer FS-GC-10; mfd. by FUKAE POWTEC) and the granulator was operated under the conditions comprising a jacket temperature of 70° C., a main shaft rotation speed of 300 rpm and a chopper rotation speed of 1700 rpm. After the temperature of the sugar had reached 60° C., the feed of a mixture of 2.5 kg of tetraacetylethylenediamine (TAED) and 0.5 kg of polyethylene glycol (PEG 6000) was started. The feed rate was maintained at 0.4 kg/h. After the completion of the feed of the mixture, the granules were cooled by introducing cold water (15° C.) into the jacket. After lowering the temperature of the granules to 40° C. or below, the granules were sieved to collect those having a diameter of 350 to 1,000 μm (weight-average particle diameter: 470 μm). The yield of the final product was 94% by weight based on the granules before being sieved.

Example 4

500 g of the granular bleach activator composition obtained in Example 3 as the final product was fed into a fluidized layer coater (trade name: AERO-COATER STREA-1; mfd. by POWREX CORPORATION). 1.0 $m^3$/min of hot air at 65° C. was introduced thereinto. When the temperature of the powder or granules had reached 35° C., spraying of 5 g/min of a 10 wt. % aqueous solution of polyvinyl alcohol was started and continued for 30 min. Then the temperature of the hot air was lowered to 50° C. and drying was conducted for about 10 min. The powder or granules was(were) cooled by introducing cooling air at 20° C. When the temperature of the powder or granules was lowered to 30° C. or below, the surface-coated granules were sieved to give the intended product having a particle diameter of 350 to 1,000 μm (weight-average particle diameter: 490 μm).

Example 5

A granular bleach activator composition having a particle diameter of 350 to 1,000 μm (weight-average particle diameter: 490 μm) was obtained in the same manner as that of Example 3 except that succinic acid having a weight-average particle diameter of 400 μm was used as the core particles, tetraacetylglycoluril (TAGU) was used as the bleach activator and polyoxyethylene (220) palmityl-ether (trade name: Emulgen 2200; mfd. by Kao Corporation) was used as the water-soluble organic binder.

Example 6

500 g of the granular bleach activator composition obtained in Example 5 was fed into a fluidized layer coater (trade name: AERO-COATER STREA-1; mfd. by POWREX CORPORATION). 1.0 $m^3$/min of hot air at 65° C. was introduced thereinto. When the temperature of the powder or the granules had reached 40° C., 15 g of polyethylene glycol (PEG 6000) was added thereto. The temperature was lowered by this addition. When the temperature was elevated again to 40° C., 5 g of polyethylene glycol (PEG 6000) was again added thereto. This operation was repeated once and then the temperature of the hot air was lowered to 20° C. and cooling was conducted for about 10 min. The powder or the granules was(were) cooled by introducing cooling air at 20° C. When the temperature of the powder or the granules was lowered to 30° C. or below, the surface-coated granules thus produced were sieved to give the intended product having a particle diameter of 350 to 1,000 μm (weight-average particle diameter: 510 μm).

Example 7

The same procedure as that of Example 1 was repeated except that Glauber's salt (sodium sulfate) having a weight-average particle diameter of 450 μm was used as the core particles and a compound of the following formula was used as the bleach activator. A product having a particle diameter of 350 to 1,000 μm (weight-average particle diameter: 550 μm) was obtained. The yield of the product was 94% by weight based on the granules before being sieved.

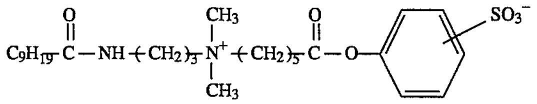

Example 8

The same procedure as that of Example 2 was repeated except that 5.0 kg of the granular bleach activator composition obtained in Example 7 as the final product was used and the temperature of the powder or the granules to be sieved was altered to 40° C. or below. A product having a particle diameter of 350 to 1,000 μm (weight,average particle diameter: 570 μm) was obtained.

Example 9

The same procedure as that of Example 3 was repeated except that the tetraacetylethylenediamine was replaced with a sodium n-nonanoyloxybenzenesulfonate of the following formula. A product having a particle diameter of 350 to 1,000 μm (weight-average particle diameter: 450 μm) was obtained. The yield of the product was 90% by weight based on the granules before being sieved.

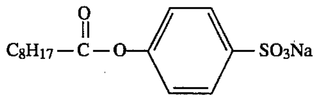

Example 10

The same procedure as that of Example 4 was repeated except that the granular bleach activator composition obtained in Example 9 as the final product was used, the spraying of the aqueous solution of polyvinyl alcohol was conducted at a rate of 6 g/min for 25 min and the temperature of the powder or the granules to be sieved was altered to 40° C. or below. A product having a particle diameter of 350 to 1,000 μm (weight-average particle diameter: 470 μm) was obtained.

Comparative Example 1

The same procedure as that of Example 1 was repeated except that potassium carbonate (weight-average particle diameter: 450 μm) was used as the core particles to give a product having a weight-average particle diameter of 525 μm.

The storability and dissolution velocity (dissolution time) of the granules obtained in the Comparative Example 1 and Example 1 were determined by test methods which will be described below. As for the storability, those of the granules per se and blended compositions were determined. The residue of the activator was 100% (granules) or 95% (blended composition) in Example 1, while it was 30% (granules) or 10% (blended composition) in Comparative Example 1. From these results, the effect obtained by using the water-soluble substance having a pH of the 3 wt. % aqueous solution thereof of 2 to 10 as the core particles is apparent. The dissolution time was as given in Table 1.

Test methods

[Storability]

10 g of the granular bleach activator composition, i.e., granules, per se or 10 g of a blended composition consisting essentially of the granules and PC in a weight ratio of 1:1 was stored in a 50-ml plastic vessel at 40° C. at a relative humidity of 80% for 4 weeks. The amount of the activator in the sample was determined by titrimetry as described below before and after the storage and the remaining rate of the activator was calculated according to the following formula:

$$\text{remaining rate of activator (\%)} = \frac{\text{(amount of titrated sodium thiosulfate after storage) (ml)}}{\text{(amount of titrated sodium thiosulfate before storage) (ml)}} \times 100$$

—Titration method—

150 ml of deionized water at 20° C. was placed in a 200-ml beaker and sodium percarbonate was dissolved therein so that the available oxygen concentration would be 0.05%. Then the granules per se or a blended composition consisting essentially of the granules and PC was added to the solution in an amount of 0.04% by weight (in terms of pure activator). The resulting solution was stirred with a mechanical stirrer having 2-cm stirring blades at 100 rpm for 10 min. 5 ml of 0.3 wt. % catalase was added to the mixture and stirred for 1 min. 10 ml of a 10 wt. % potassium iodide solution and 10 ml of a 20 wt. % sulfuric acid solution were added to the solution and the titration was conducted with a 0.1N sodium thiosulfate solution.

[Dissolution time]

1000 ml of deionized water at 20° C. was placed in a 1000-ml beaker and then the beaker was fitted with a conductivity meter. 5 g of the granules was added thereto and stirred with a mechanical stirrer having 2-cm stirring blades at 300 rpm while the conductivity was recorded on the chart. The measurement was terminated when the conductivity had become constant. The time taken for reaching the constant conductivity was taken as the dissolution time.

Comparative Example 2

A granular bleach activator composition was produced in the same manner as that of Example 5 except that Zeolite A (weight-average particle diameter: 80 μm) was used as the core particles.

The storability and dissolution velocity of the granules obtained in Comparative Example 2 and those obtained in Example 5 were determined by the above-described test methods. The dissolution velocity of the granules obtained in Example 5 was 62.0 sec, while that of the granules obtained in Comparative Example 2 was 101.5 sec, the latter being about 1.6 times as long as the former. The effect obtained by using the water-soluble substance as the core particles is apparent from the fact that the dissolution velocity of succinic acid (water-soluble core particles) used in Example 5 was high. The storabilities were as given in Table 1.

Comparative Example 3

4.1 kg of tetraacetylethylenediamine (TAED) and 0.9 kg of polyethylene glycol (PEG 6000) (total: 5 kg) were fed into a granulator (Lödige Mixer M-20; mfd. by Matsuzaka Company Ltd.) and heated under the conditions comprising a Jacket temperature of 70° C. and a main shaft rotation speed of 1000 rpm for 15 min. Then the mixture was granulated by extrusion on a horizontal extrusion granulator (Pelleter Double EXD-60 having a screen diameter of 1.0 mm; mfd. by FUJI PAUDAL Co., Ltd.). 3.0 kg of the obtained granules were fed into a MARUMERIZER (Q-400; mfd. by FUJI PAUDAL Co., Ltd.) and treated at a rotation speed of 600 rpm for 5 min. The granules thus obtained were sieved to collect those having a diameter of 350 to 1,000 μm (weight-average particle diameter: 490 μm).

The storability and dissolution velocity of the granules obtained in Comparative Example 3 and those obtained in Examples 1, 3, 5, 7 and 9 were determined by the above-described test methods. It is apparent from the results given in Table 1 that the solubility of the granules obtained in Comparative Example 3 was inferior to that of the granules of the present invention.

The results of the tests (stability and dissolution velocity) obtained in the above Examples and Comparative Examples are given in Table 1.

TABLE 1

| | | Ex. No. | | | | | | | | | | Comp. Ex. No. | | |
|---|---|---|---|---|---|---|---|---|---|---|---|---|---|---|
| | | 1 | 2 | 3 | 4 | 5 | 6 | 7 | 8 | 9 | 10 | 1 | 2 | 3 |
| Stability (%) | granules | 100 | 100 | 100 | 100 | 100 | 100 | 100 | 100 | 100 | 100 | 30 | 100 | 100 |
| | blended composition | 95 | 100 | 85 | 100 | 90 | 100 | 95 | 100 | 90 | 100 | 10 | 88 | 84 |
| Dissolution time (sec) | | 66 | 65 | 65 | 68 | 62 | 68 | 65 | 66 | 63 | 65 | 57 | 101.5 | 99.5 |

Example 11

4.0 kg of PC (having a water content of 0.5 wt. %, a weight-average particle diameter of 495 μm and a temperature of 20° C.) was fed into a stirrer mixer (High Speed Mixer FS-GC-10; mfd. by FUKAE POWTEC) and then 0.35 kg of a 60 wt. % aqueous solution of sodium metaborate tetrahydrate at a temperature of 70° C. was added dropwise thereto under stirring at 300 rpm for 3 min. Thereafter the mixture thus obtained was stirred for 1 min while passing water at a temperature of 20° C. through the jacket. The mixture was transferred into a fluid vessel (SFC-15; mfd. by FREUND INTERNATIONAL LTD.), dried with hot air at 80° C. for 10 min and then cooled with cold air at 20° C. for 5 min. The mixture was sent back into the stirrer mixer and the same operation as that described above was repeated. The quantity of a 60 wt. % aqueous solution of sodium metaborate tetrahydrate used was 0.21 kg. 2.7 kg of PC particles having an inner surface and an outer surface coated with sodium metaborate and a weight-average particle diameter of 500 μm thus obtained, 1.9 kg of tetraacetylethylenediamine (TAED) and 0.4 kg of polyethylene glycol (PEG 6000) (total: 5 kg) were fed into an agitation rolling granulator (High-speed Mixer FS-GC-10; mfd. by FUKAE POWTEC) and granulated under the conditions comprising a jacket temperature of 70° C., a main shaft rotation speed of 300 rpm and a chopper rotation speed of 1700 rpm for about 15 min. After the completion of the granulation, the granules were cooled by introducing cold water (15° C.) into the jacket. After lowering the temperature of the granules to 40° C. or below, the granules were sieved to collect those having a particle diameter of 350 to 1,000 μm (weight-average particle diameter: 500 μm). The yield of the final product was 98% by weight based on the granules before being sieved.

Example 12

4.5 kg of the granular bleach activator composition obtained in Example 11 as the final product was fed into a pan coater (DRC-500; mfd. by FREUND INTERNATIONAL LTD.). The coating pan was rotated at 20 rpm while blowing 3.5 $m^3$/min of hot air at 65° C. thereinto. When the temperature of the powder or the granules had reached 85° C., spraying of 20 g/min of a 10 wt. % aqueous solution of hydroxypropylmethylcellulose was started and continued for 70 min. Then the temperature of the hot air was lowered to 50° C. and drying was conducted for about 10 min. The powder or the granules was(were) cooled by introducing cooling air at 20° C. When the temperature of the powder or the granules was lowered to 30° C. or below, the surface-coated granules thus obtained were sieved to give the intended product having a particle diameter of 350 to 1,000 μm (weight-average particle diameter: 510 μm).

Example 13

1.8 kg of PB having a weight-average particle diameter of 500 μm was fed into an agitation tumbling granulator (High-Speed Mixer FS-GC-10; mfd. by FUKAE POWTEC) and the granulator was operated under the conditions comprising a jacket temperature of 70° C., a main shaft rotation speed of 300 rpm and a chopper rotation speed of 1700 rpm. After the temperature of PB reached 60° C., the feed of a mixture of 2.8 kg of tetraacetylethylenediamine (TEAD) and 0.4 kg of polyethylene glycol (PEG 6000) was started. The feed rate was maintained at 0.53 kg/h. After the completion of the feed of the mixture, the granules were cooled by introducing cold water (15° C.) into the jacket. After lowering the temperature of the granules to 40° C. or below, the granules were sieved to collect those having a particle diameter of 350 to 1,000 μm (weight-average particle diameter: 500 μm). The yield of the final product was 95% by weight based on the granules before being sieved.

Example 14

500 g of the granular bleach activator composition obtained in Example 13 as the final product was fed into a fluidized layer coater (trade name: AERO-COATER STREA-1; mfd., by POWREX CORPORATION). 1.0 $m^3$/min of hot air at 65° C. was introduced thereinto. When the temperature of the powder or the granules had reached 35° C., spraying of 5 g/min of a 10 wt. % aqueous solution of polyvinyl alcohol was started and continued for 30 min. Then the temperature of the hot air was lowered to 50° C. and drying was conducted for about 10 min. The powder or the granules was(were) cooled by introducing cooling air at 20° C. When the temperature of the powder or the granules was lowered to 30° C. or below, the surface-coated granules thus obtained were sieved to give the intended product having a particle diameter of 350 to 1,000 μm (weight-average particle diameter: 510 μm).

Example 15

A granular bleach activator composition having a particle diameter of 350 to 1,000 μm (weight-average particle diameter: 450 μm) was obtained in the same manner as that of Example 11 except that tetraacetylglycoluril (TAGU) was used as the bleach activator and polyoxyethylene (220) palmityl ether (trade name: Emulgen 2200; mfd. by Kao Corporation) was used as the water-soluble organic binder.

Example 16

500 g of the granular bleach activator composition obtained in Example 15 was fed into a fluidized layer coater (trade name: AERO-COATER STREA-1; mfd. by POWREX CORPORATION). 1.0 $m^3$/min of hot air at 65° C. was introduced therein. When the temperature of the powder or the granules had reached 40° C., 10 g of polyethylene glycol was added thereto. The temperature was lowered by this addition. When the temperature of the powder was elevated again to 40° C., 10 g of polyethylene glycol was again added thereto. This operation was repeated once and then the temperature of the hot air was lowered to 20° C. and cooling was conducted for about 10 min. When the temperature of the powder or the granules was lowered to 30° C. or below, the surface-coated granules thus obtained were sieved to give the intended product having a particle diameter of 350 to 1,000 μm (weight-average particle diameter: 460 μm).

Example 17

The same procedure as that of Example 11 was repeated except that the hot air drying temperature was lowered to 75° C. and a compound of the following formula was used as the bleach activator. The product having a particle diameter of 350 to 1,000 μm (weight-average particle diameter: 480 μm) was obtained. The yield of the product was 984 by weight based on the granules before being sieved.

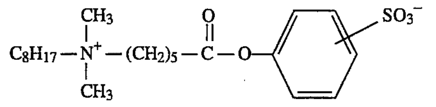

Example 18

The same procedure as that of Example 12 was repeated except that 5.0 kg of the granular bleach activator composition obtained in Example 17 as the final product was used. The product having a particle diameter of 350 to 1,000 μm (weight-average particle diameter: 500 μm) was obtained.

Example 19

The same procedure as that of Example 13 was repeated except that a compound of the following formula was used as the bleach activator and the feed of the mixture of tetraacetylethylenediamine (TEAD) and polyethylene glycol (PEG 6000) was conducted at a feed rate of 0.60 kg/h. The product having a particle diameter of 350 to 1,000 μm (weight-average particle diameter: 480 μm) was obtained. The yield of the product was 90% by weight based on the granules before being sieved.

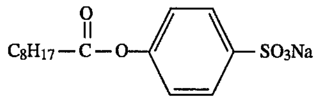

Example 20

500 g of the granular bleach activator composition obtained in Example 19 as the final product was fed into a fluidized layer coater (trade name: AERO-COATER STREA-1; mfd. by POWREX CORPORATION). 1.0 $m^3$/min of hot air at 65° C. was introduced thereinto. When the temperature of the powder or the granules had reached 35° C., spraying of 6 g/min of a 10 wt. % aqueous solution of polyvinyl alcohol was started and continued for 25 min. Then the temperature of the hot air was lowered to 50° C. and drying was conducted for about 10 min. The powder or the granules was(were) cooled by introducing cooling air at 20° C. When the temperature of the powder or the granules was lowered to 40° C. or below, the surface-coated granules thus obtained were sieved to give the intended product having a particle diameter of 350 to 1,000 μm (weight-average particle diameter: 490 μm).

Comparative Example 4

The same procedure as that of Example 11 was repeated except that PC having an inner surface and an outer surface neither coated nor penetrated with any borate was used as the core particles to give a granular bleach activator composition.

The storability and dissolution velocity of the granules obtained in Comparative Example 4 and Example 11 were determined by the above-described test methods except that the samples were stored at 40° C. at a relative humidity of 80% for 2 weeks in the storability test. The residue of the activator was 100% (granules per se) or 93% (blended composition) in Example 11, while it was 70% (granules per se) or 56% (blended composition) in Comparative Example 4. From these results, the effect obtained by using PC having an inner surface and/or an outer surface coated with the borate as the core particles is apparent. The dissolution velocity was as given in Table 2.

Comparative Example 5

4.1 kg of tetraacetylethylenediamine (TAED) and 0.9 kg of polyethylene glycol (PEG 6000) (total: 5 kg) were fed into a granulator (Lödige Mixer M-20; mfd. by Matsuzaka Company Ltd.) and heated under the conditions comprising a jacket temperature of 70° C. and a main shaft rotation speed of 1000 rpm for 15 min. Then the mixture was granulated by extrusion on a horizontal extrusion granulator (Pelleter Double EXD-60 having a screen diameter of 1.0 mm: mfd. by FUJI PAUDAL Co., Ltd.). 3.0 kg of the obtained granules were fed into a MARUMERIZER (Q-400; mfd. by FUJI PAUDAL Co., Ltd.) and treated at a rotation speed of 600 rpm for 5 min. The granules were sieved to collect those having a diameter of 350 to 1,000 μm.

The storability and dissolution velocity of the granules obtained in Comparative Example 5 and those obtained in Examples 11, 13, 15, 17 and 19 were determined under the same conditions as those in the tests of the granules obtained in Comparative Example 4 and Example 11. It is apparent from the results given in Table 2 that the solubility of the granules obtained in Comparative Example 5 was inferior to that of the granules of the present invention.

The results of the tests (stability and dissolution velocity determined under the same conditions as those of the tests of the granules obtained in Comparative Example 4 and Example 11) obtained in the above Examples 11 to 20 and Comparative Examples 4 and 5 are given in Table 2.

TABLE 2

| | | Ex. No. | | | | | | | | | | Com. Ex. No. | |
|---|---|---|---|---|---|---|---|---|---|---|---|---|---|
| | | 11 | 12 | 13 | 14 | 15 | 16 | 17 | 18 | 19 | 20 | 4 | 5 |
| Stability (%) | granules | 100 | 100 | 100 | 100 | 100 | 100 | 100 | 100 | 100 | 100 | 70 | 100 |
| | blended composition | 93 | 100 | 91 | 100 | 92 | 100 | 95 | 100 | 90 | 100 | 56 | 85 |
| dissolution time (sec) | | 67 | 69 | 63 | 67 | 65 | 65 | 65 | 66 | 64 | 66 | 65 | 99.5 |

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A process for producing a coated granular bleach activator composition (I), which comprises adding to a core particle (a) already present, in a granulator, 10 to 500 parts by weight of a powdery bleach activator and 3 to 100 parts by weight of a water-soluble organic binder based on 100 parts by weight of said substance (a), to produce core particles having a coating thereon comprising said bleach activator and said binder such that said produced coated granules have a weight-average particle diameter of 100 to 3,000 μm, wherein said core particle (a) is a water-soluble substance having a pH of 2 to 10 in a 3 wt. % aqueous solution thereof.

2. The process for producing a granular bleach activator composition (I) according to claim 1, wherein the water-soluble organic binder is one or a mixture of two or more members selected from the group consisting of polyethylene glycol, polypropylene glycol and a nonionic surfactant, each having a melting point of 20° to 80° C.

3. The process for producing a granular bleach activator composition (I) according to claim 1, wherein said granulation is conducted by an agitation/rolling granulating process.

4. The process for producing a granular bleach activator composition (I) according to claim 1, wherein the core particle has a weight-average particle diameter of 50 to 3,000 μm.

5. The process for producing a granular bleach activator composition (I) according to claim 1, wherein the powdery bleach activator has a particle diameter of 0.5 to 200 μm.

6. The process for producing a granular bleach activator composition (I) according to claim 1, wherein the powdery bleach activator is at least one member selected from the group consisting of tetraacetylethylenediamine, tetraacetylglycoluril,

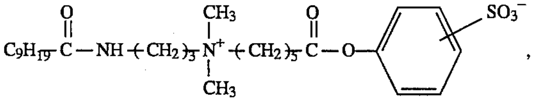

,

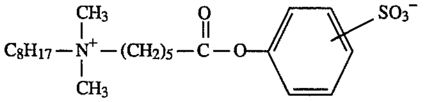

and

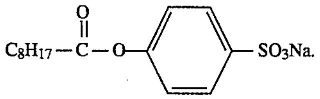

7. The process for producing a coated granular bleach activator composition (I) according to claim 1, further adding to the already present core particles (a) in a granulator at least one member selected from the group consisting of an anionic surfactant, a nonionic surfactant, an anti-redeposition agent, a bleach stabilizer, a stabilizer for peroxide or peroxide adducts, an organic acid, an inorganic acid and zeolite.

8. The process according to claim 7, wherein said anionic surfactant is selected from a sulfonate or a sulfate having a $C_8$–$C_{22}$ alkyl group, and a $C_9$–$C_{15}$ alkyl benzene sulfonate.

9. The process according to claim 7, wherein said nonionic surfactant is a condensate of a $C_6$–$C_{12}$ alkylphenol with 5 to 25 moles of ethylene oxide.

10. The process according to claim 7, wherein said redeposition agent is polyvinyl pyrrolidone.

11. The process according to claim 7, wherein said bleach stabilizer is sodium polyacrylate.

12. The process according to claim 7, wherein said stabilizer is magnesium sulfate or magnesium silicate.

13. The process according to claim 7, wherein said acid is formic, propionic, citric, fumaric or succinic acid.

14. The process according to claim 7, wherein said inorganic acid is phosphonic acid or sodium sulfite.

15. A process for producing a two-coated granular bleach activator composition (II), which further comprises adding a water-soluble high-molecular weight substance or an aqueous solution of a water-soluble high-molecular weight substance with the coated granular bleach activator composition (I) produced by the process set forth in claim 1 and then heating, cooling or drying the mixture to produce granules having a second coat of water-soluble high-molecular weight substance, said two-coated granules having a weight-average particle diameter of 100 to 4,000 μm.

16. The process for producing a granular bleach activator composition (II) according to claim 15, wherein the water-soluble high-molecular weight substance is one member or a mixture of two or more members selected from the group consisting of polysaccharides which may have a sulfate group, polysaccharides having a hydroxyalkyl group, polysaccharides having a carboxyalkyl group, methylcellulose, polyvinyl-pyrrolidone, polyvinyl alcohol and polyethylene glycol.

17. The process according to claim 1, wherein said core particle (a) is a water-soluble inorganic substance.

18. The process according to claim 17, wherein said water-soluble inorganic substance is selected from the group consisting of sodium dihydrogenphosphate, potassium dihydrogenphosphate, potassium chloride, sodium chloride, sodium sulfate, magnesium sulfate, ammonium phosphate and sodium nitrate.

19. The process according to claim 1, wherein said core particle (a) is a water-soluble organic substance.

20. The process according to claim 19, wherein said water-soluble organic substance is selected from the group consisting of sugar, calcium acrylate, magnesium acrylate, citric acid, succinic acid, fumaric acid, maleic acid and sodium alginate.

* * * * *